J. R. MARCKS.
ROLLER FOR CANE MILLS.
APPLICATION FILED FEB. 4, 1909.
998,367.
Patented July 18, 1911.
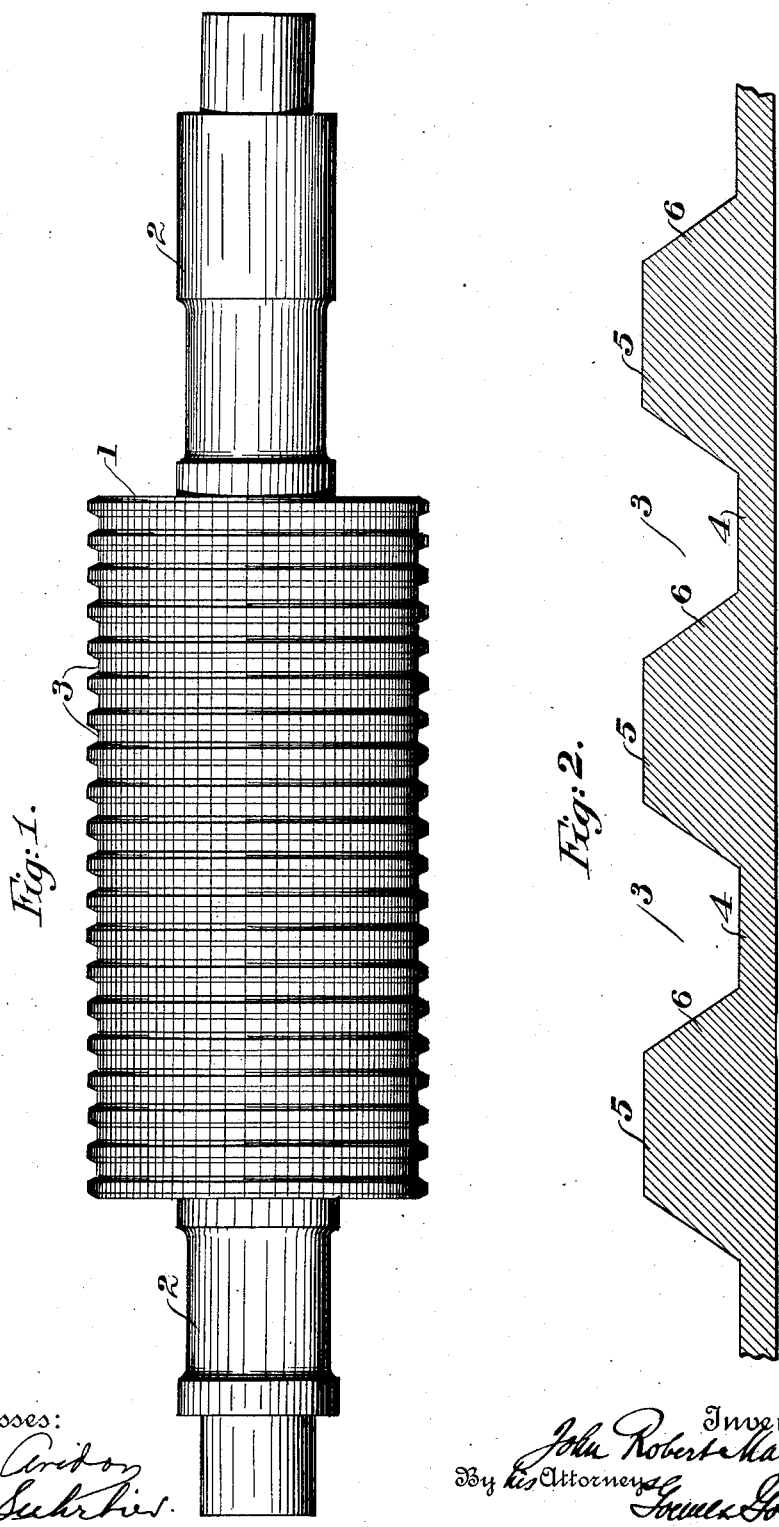

UNITED STATES PATENT OFFICE.

JOHN ROBERT MARCKS, OF SURABAYA, JAVA.

ROLLER FOR CANE-MILLS.

998,367.           Specification of Letters Patent.     Patented July 18, 1911.

Application filed February 4, 1909. Serial No. 476,146.

*To all whom it may concern:*

Be it known that I, JOHN ROBERT MARCKS, a subject of the Queen of the Netherlands, and resident of Modjokerto, Residency of Surabaya, Island of Java, Dutch East Indies, have invented certain new and useful Improvements in Rollers for Cane-Mills, of which the following is a specification.

This invention relates to rollers for use in cane-mills in connection with one or more similar rollers or plain rollers.

The object of the invention is to provide a roller of this kind which will extract the juice from the cane more thoroughly than heretofore and which will permit of a larger quantity of material to be fed through the mill, at the same time reducing the amount of power used. To this end I have provided a roller having its cylindrical surface provided throughout with annular grooves of truncated V-shaped cross-section, these rollers being adapted to coöperate with plain or similarly grooved rollers or both. In this manner the effective surface of the rollers is increased more than one-fifth.

In the accompanying drawing, Figure 1 is a side-view of the improved roller, and Fig. 2 is a sectional view taken longitudinally of the roller and across the grooves.

Similar characters of reference refer to like parts throughout the figures.

As shown, the roller 1 is mounted on the usual shaft 2 adapting it for rotation in the frame of the cane-mill. The cylindrical surface of the roller is provided, from end to end if desired, with a plurality of spaced annular grooves of truncated V-shaped cross-section; that is to say, the bottom 4 of the groove and the space 5 between the grooves form cylindrical surfaces coaxial with the roller, while the sides 6 of the groove are slanting or conical. It is quite obvious that by making the faces 4 and 5 narrow and the faces 6 wide and steep, the effective surface of the roller can be increased several times. However, I have found that to increase the effective surface about one-fifth, as shown, provides a desirable and efficient form of roller. This form of roller increases the friction surface, as stated, by about one-fifth and the capacity is much larger. By the difference in circumferential speed of the faces 4 and 5 the cane is caused to be better broken and shredded than by the mills heretofore used.

The grooved roller may be used in conjunction with other plain or grooved rollers or rollers of both kinds. If used with another grooved roller the grooves should be placed in staggered relation with the groove of one roller receiving the ridge between the grooves of the other roller, thus permitting all of the active surface of the respective rollers to be brought close together.

Having thus described my invention, I claim as new and desire to secure by Letters Patent:

1. A crushing-roll for cane-mills comprising a body of approximately cylindrical cross-section, provided at its periphery with a plurality of shallow, spaced, annular grooves, annular ridges at the outer portion of the roll between and separating the said grooves, transversely straight, plane, annular, outer circumferential faces or tops for said ridges, inclined side walls for said grooves on said ridges, and transversely straight, plane, annular bottoms between said inclined side walls, at the bottom of the grooves, said ridge-faces and groove bottoms being of approximately equal transverse width and making equal angles with said inclined side walls, and the said annular bottoms being concentric with the said flat outer faces of said annular ridges.

2. In a cane-mill, a pair of crushing rolls each comprising a body of approximately cylindrical cross-section, provided at its periphery with a plurality of shallow, spaced annular grooves, annular ridges at the outer portion of the roll between and separating the said grooves, transversely straight, plane, annular, outer circumferential faces or tops for said ridges, inclined side walls for said grooves on said ridges, and transversely straight, plane, annular bottoms between said inclined side walls, at the bottom of the grooves, said ridge-faces and groove bottoms being of approximately equal transverse width and making equal angles with said inclined side walls, and the said annular bottoms being concentric with the said flat outer faces of said annular ridges, the ridges of one roll being of approximately equal cross-section and of like shape with the grooves of the other roll and engaging therein.

In testimony whereof I affix my signature in presence of two witnesses.

JOHN ROBERT MARCKS.

Witnesses:
 GUYT,
 W. CRAME.

Copies of this patent may be obtained for five cents each, by addressing the "Commissioner of Patents, Washington, D. C."